June 30, 1959 G. T. MOO 2,892,522
OVERRUNNING CLUTCHES
Filed Jan. 9, 1956 2 Sheets-Sheet 2
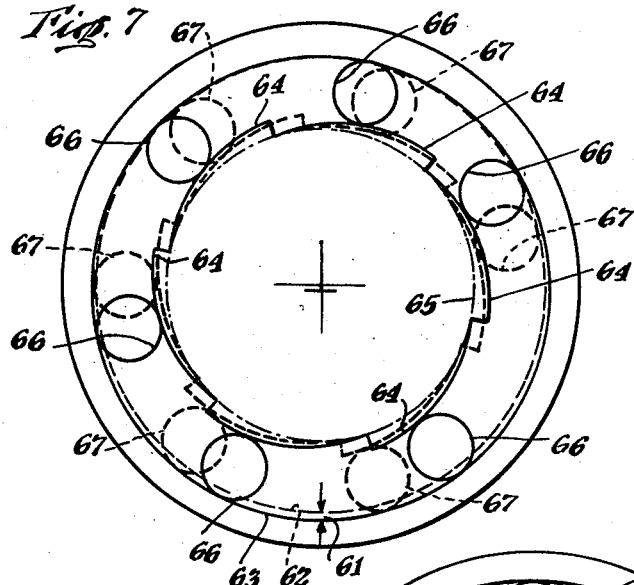
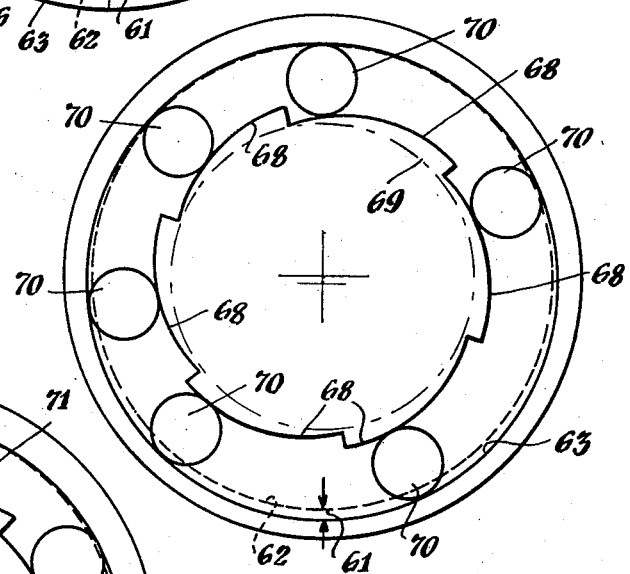
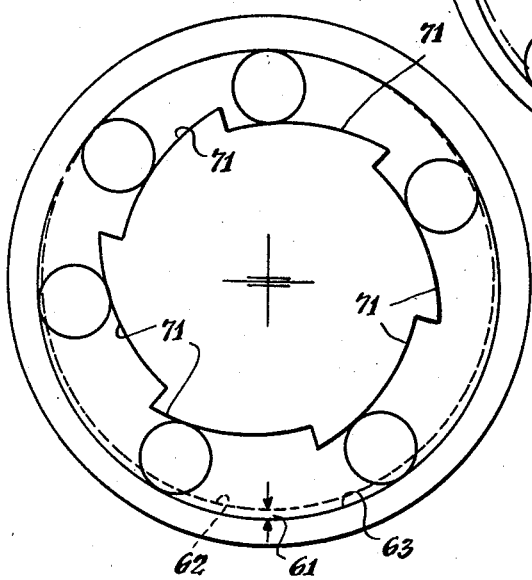
INVENTOR
Gothard Theodore Moo
BY
George F. Des Marais
ATTORNEY United States Patent Office 2,892,522
Patented June 30, 1959

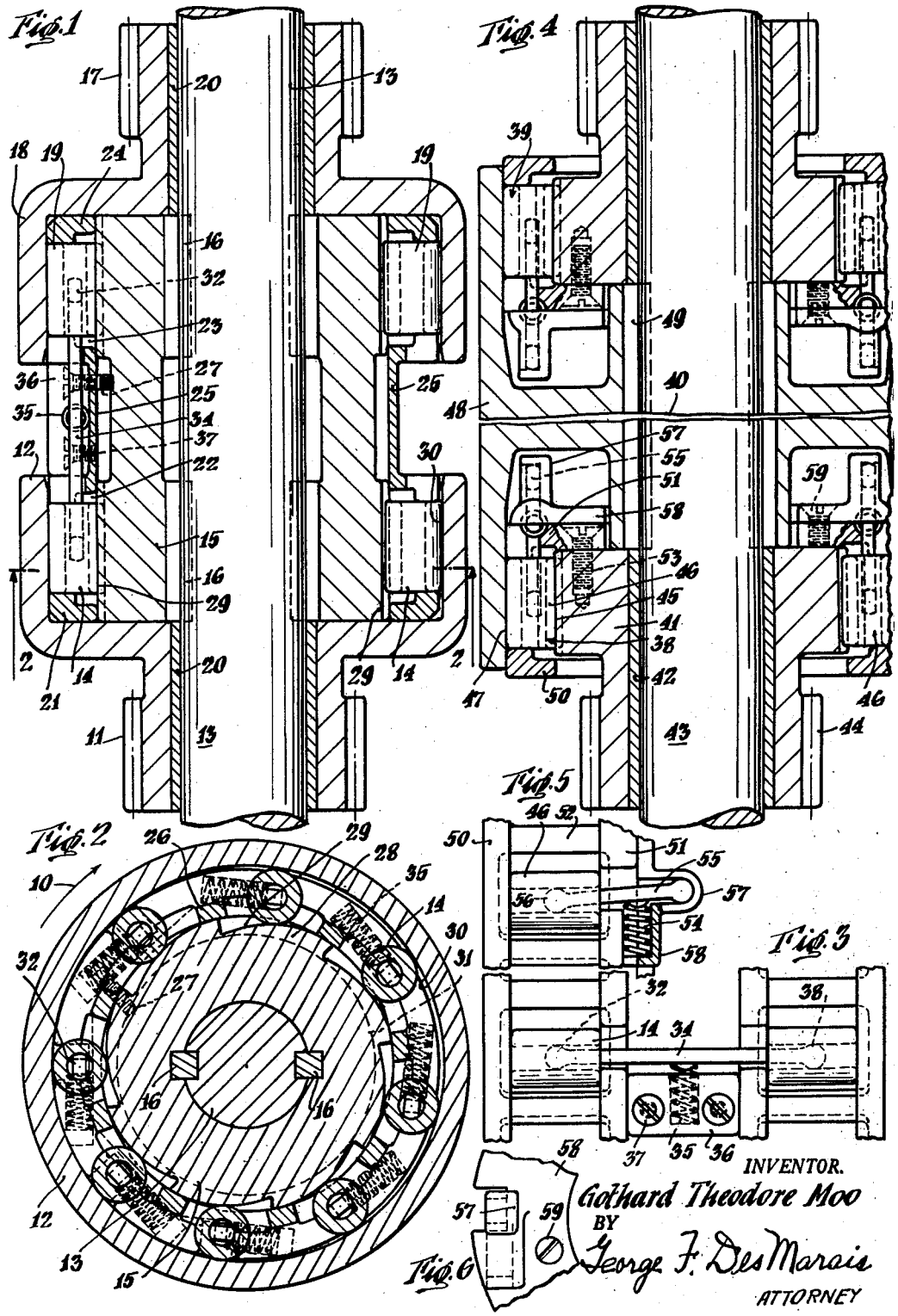

2,892,522
OVERRUNNING CLUTCHES

Gothard Theodore Moo, Cranston, R.I., assignor to Weskenson Corporation, Providence, R.I., a corporation of Rhode Island Application January 9, 1956, Serial No. 558,110

4 Claims. (Cl. 192—45)

This invention relates to overrunning clutches, and among the purposes of the invention is to improve the operation and life of overrunning clutches which have a series of wedging elements such as rollers arranged between a series of camming surfaces on one clutch member and a circumferentially continuous clutching surface on the other clutch member. In such clutches the opposing surfaces of the two clutch members form a series of wedge-like spaces, each containing a roller, and a spring is employed to urge the roller toward the narrowest end of its space. The springs are carried by a roller cage which rotates with the clutch member having the camming surfaces. It is common to locate a spring between successive rollers and to have it bear upon or exert pressure against the exterior of a roller at a point midway between its ends. Hence, the number of rollers within a given circumference is limited by the lengths of the springs.

An object of the present invention is to enable the use of more camming surfaces and more wedge-shaped spaces and rollers within a given circumference. This is attained by utilizing hollow rollers and by applying yielding pressure thereon by the use of springs mounted to one side of the rollers and by arms or levers transmitting pressure from individual springs to the interior of a hollow roller. The construction enables the use of more rollers than would be the case if each roller were acted upon by a spring mounted between successive rollers.

The life of an overrunning clutch is oftentimes more limited than should be expected because of the many wedging engagements which a roller makes against the same spots or areas of the clutch members. Each wedging engagement peens the engaged surface and causes such wear as to deleteriously interfere with the operation of the clutch and accelerate its wearing out.

In the clutch mechanism of the present invention the camming surfaces on one of the clutch members and the circumferentially continuous clutching surface on the other clutch member are so disposed relatively to each other as to cause the wedge-like spaces therebetween continually to vary in expanse as the clutch members rotate relatively to one another so that the rollers engage different areas on the respective surfaces when clutching engagement occurs in different relative angular positions of the two clutch members. This is accomplished by making the circumferentially continuous clutching surface of a cylindrical rollway eccentric to the axis of rotation of the clutch. Other objects and advantages will appear more fully in the accompanying description and drawings of clutch mechanisms in which the principles of the invention are employed.

In the drawings, Fig. 1 is a section along the axis of a clutch mechanism employing the invention;

Fig. 2 is a cross-section on line 2—2 of Fig. 1;

Fig. 3 is a fragmentary view showing a portion of the outside of the roller cage shown in Fig. 1;

Fig. 4 is a modified form of clutch;

Fig. 5 is a fragmentary view of a portion of the outside of the roller cage of the clutch shown in Fig. 4;

Fig. 6 is a side view of the mounting for the lever and spring shown in Fig. 5;

Fig. 7 is a diagrammatic illustration of relative positions of rollers of a clutch having an eccentric clutching surface;

Fig. 8 is a diagrammatic showing of a clutch wherein camming surfaces are spaced different distances apart circumferentially;

Fig. 9 is a diagrammatic showing of the disposition of rollers in a clutch having camming surfaces disposed at various distances from the axis of rotation of the clutch.

Each of the clutches illustrated in Figs. 1 and 4 has two clutching mechanisms which transmit power from two oscillatory sources for the purpose of imparting constant speed to a common shaft. Each oscillatory source transmits power in the same direction and the roller-engaging surfaces of the respective clutching mechanisms of each clutch are similar. The wedge-like spaces for the rollers are narrower in the direction of the arrow 10, Fig. 2. A mechanical transmission in which a double form of clutch is used is described in the U.S. Patent No. 2,448,386, dated August 31, 1948, but, as will hereinafter appear, the present invention is useful in a clutch having but one set of rollers.

Referring to Fig. 1, power input is intermittently applied to a gear 11 integral with or attached to an outer clutch member 12 and rotary motion is transmitted in the direction of the arrow 10, Fig. 2, to the shaft 13 through the set of rollers 14 and the inner clutch member 15. The inner clutch member is splined to the shaft 13 as by a key 16. The inner clutch member 15 and the shaft 13 are driven in the same direction intermittently as power is applied to the gear 17 on the outer clutch member 18 of the second clutch which drives the inner clutch member 15 through a second set of rollers 19. In this manner the shaft 13 is rotated at constant speed. The outer clutch members 12 and 18 are individually mounted on bearing sleeves 20 which surround the shaft 13 so that one of the outer clutch members may be rotated relatively to the shaft in the opposite direction when the other is in driving engagement with the inner clutch member 15.

A ring in the form of a double cage having annular members 21 and 22 adjacent the ends of the rollers 14, and annular members 23 and 24 adjacent the ends of the rollers 19 is disposed intermediate the outer and inner members of the respective clutch mechanisms. The annular members 22 and 23 are connected together by axially extending stays 25 and the pair of annular members at the ends of each set of rollers is connected together by bars 26 which are distributed around the ring at intervals and so provide openings for accommodating the rollers. The intermediate ring or cage is fastened to the inner clutch member 15 in any suitable manner as by a screw 27.

As shown in Fig. 2, the rollers are located in openings between successive bars of the intermediate ring. Around the inner clutch member 15 there are a series of lands 28, one for each of the rollers. The outer surface 29 of each land is a camming surface which forms a wedge-like space with a cylindrical rollway 30 providing a circumferentially continuous clutching surface on the outer clutch member. The form of the camming surface 29 is such as to provide frictional contact with its associated roller when the roller is in wedging contact therewith and with the clutch surface 30 during a driving operation. I prefer to employ a camming surface having a constant rise. Such a camming surface is obtained by an Archimedian spiral. The angle for a spiral of this type is the angle formed by a tangent to the spiral at any given point on the spiral and by a straight line passing through that point and tangential to the base circle from which the spiral is generated. This angle is constant for all points along the spiral and therefore a camming surface in the form of an Archimedian spiral provides the same wedging action with a roller contacting therewith at any point along its surface. The tangent of the angle selected for the spiral should have a value of less than the coefficient of friction of the material of the rollers on the material of the camming surface when coated with the lubricant that is to be used. In Fig. 2 the camming surfaces 29 are generated with reference to a base circle 31 which is concentric to the axis of rotation of the shaft 13 and of the inner clutch member 15.

The rollers are constantly urged toward the narrow ends of the wedge-like spaces between the several camming surfaces and the rollway 30 on the outer clutch member, so that the rollers may immediately become wedged into clutching engagement whenever torque is applied to the inner clutch member. Each roller is in the form of a hollow cylinder and the interior of the cylinder is engaged by a ball-shaped end 32, Fig. 3, of the arm of a lever 34 which is engaged by a spring 35 tensioned between the lever and a block 36. Each block is fastened to a stay 25 of the cage by screws 37. The other end of the lever extends across the cage and engages the interior of a roller of the second clutch mechanism. With this arrangement the rollers of both of the clutching mechanisms are continuously and yieldingly pressed toward the narrow ends of the wedge-like spaces in which the several rollers are located. By locating the springs beyond the ends of the rollers, it is possible to utilize more rollers within a given circumference than if springs were used between the rollers as in conventional constructions.

In the arrangement illustrated in Fig. 2, the cylindrical clutching surface 30 is circular and eccentric to the axis of rotation of the shaft and of the outer clutch member. Since the camming surfaces 29 are located concentrically with reference to the axis of rotation of the shaft 13, the wedge-like spaces between the clutching surface 30 and the camming surfaces vary in expanse radially so that when the rollers are in clutching engagement with the surfaces they are spaced apart at different distances. These distances continually change when the clutch members rotate relatively to one another in between torque transmitting clutching actions. Therefore, for any clutching actions at angular displacements of the clutch member occurring at other than 360 degrees apart any one roller will be wedged against different spots or areas of its camming surface.

A modified form of double-clutch is illustrated in Figs. 4, 5 and 6. This construction includes individual clutching mechanisms 38 and 39, one at either side of the broken line 40. Since the clutching mechanisms are mirror likenesses of one another, it will suffice to describe but one of them. The inner clutch member 41 is mounted on a bearing sleeve 42 around the driven shaft 43 and is free to rotate with respect to the shaft except when power is transmitted through the clutch. Power is applied to the inner clutch member 41 through the gear 44. The inner clutch member 41 has a series of lands 45 equal in number to the number of rollers 46 circumferentially spaced about the inner clutch member. When the clutch is in engagement the rollers are wedged between camming surfaces on the lands and a cylindrical rollway 47 on the interior of the outer clutch member 48. The outer clutch member is fixed to the shaft 43 by a key 49.

The rollers are held endwise by an intermediate ring in the form of a cage having a pair of annular members 50, 51, connected together by bars 52 distributed around the cage between the rollers. The cage is secured to the inner clutch member by a screw 53. The rollers are hollow cylinders. Each roller is urged toward the narrower end of a wedge-like space between the inner and outer clutch members by a spring 54 and a lever 55, as best seen in Fig. 5. The free end of the lever 56 engages the roller internally. Each of the several levers is fulcrumed in a housing 57 which is an integral part of a circular plate 58 which is secured to one side of the cage by screws 59. Each spring 54 is supported in part in a semi-circular groove in the annular member 51 and in part in a housing 57. The double clutch illustrated in Fig. 4 functions similarly to the double clutch illustrated in Fig. 1, but it is apparent that the mechanism at one side of the broken line 40 is complete and useful as a one-way clutch.

In each of the diagrams of Figs. 7, 8 and 9, the cylindrical rollway or clutching surface at the interior of an outer clutch member is eccentric with the axis of rotation of the clutch. The eccentricity of the cylindrical rollway is indicated generally by the radial space 61 between a concentric circle 62 and the eccentric clutch surface 63 of the outer member.

In the diagram of Fig. 7, the camming surfaces of the several lands 64 have been generated at equal distances apart with reference to a common base circle 65 which is concentric to the axis of rotation of the clutch. The circles 66 show the instantaneous positions of the wedging elements when the inner and outer clutch members are in one relationship, and the circles 67 indicate the positions of the wedging elements after a change has taken place in the position of one clutch member with respect to the other. With clutch engagements occurring at the two angular positions shown the wedging elements are wedged against spaced apart portions of their respective caming surfaces on the several lands. The frequency of impact of the rollers on the same surfaces for repeated clutching actions is very much reduced, with the result that the clutch has a long life. However, it will be understood that in this form of my invention, it is possible for the wedging elements to make clutching engagement with eccentric surface 63 at the same points on the latter a limited number of different times throughout one complete revolution of the inner and outer clutch members with respect to each other. More specifically, since Fig. 7 illustrates six camming surfaces and wedging elements, it follows that each time the clutch members are rotated exactly 60° with respect to each other, the relative positioning of the wedging elements is not changed, and hence, contact with surface 63 will be made at exactly the same points.

Similar but improved results are obtainable in a clutch having the structural characteristics diagrammed in Fig. 8. In this diagram all of the camming surfaces 68 on the lands are also generated from a common base circle 69 which is concentric to the center of rotation of the clutch, but the lands are spaced at different distances apart circumferentially. In this arrangement the circumferential spacing of the rollers 70 changes continuously and the rollers are wedged into contact with the clutch surfaces 63 and 68 at different areas of contact for different relative angular positions of the inner and outer clutch members. In this form of my invention, since the spacing between the wedging elements is never the same throughout one complete revolution of the inner and outer clutch members with respect to each other, it therefore follows that throughout one complete relative revolution, it is impossible for clutching engagement to occur more than once at the same point on surface 63 as well as on the camming surfaces 68.

An extensive lengthwise area of a camming surface may be made available for receiving the wedging impacts of a roller during a series of clutching actions by locating the caming surfaces at various radii with respect to the center of rotation of the clutch members. This arrangement is diagrammatically illustrated in Fig. 9 wherein the camming surfaces 71 are equally spaced apart circumferentially and are spaced at unequal distances from the axis of rotation of the clutch. This may be accomplished by generating the camming surfaces from base circles of different diameters or by generating the camming surfaces from a common base circle which is eccentric to the axis of rotation of the clutch. In this form of my invention, like that of Fig. 8 hereinbefore discussed, the spacing between wedging elements continuously changes throughout one complete relative revolution of the inner and outer clutch members, and hence, clutching contact is never made at the same point on either member more than once per revolution.

This invention is capable of numerous forms and various applications without departing from the essential features herein disclosed. It is therefore intended and desired that the specific description herein be deemed illustrative and not restrictive and that the patent shall cover all patentable novelty herein set forth; reference being had to the following claims rather than to the particular showing herein to indicate the scope of this invention.

What is claimed is:

1. In an overrunning clutch, inner and outer members relatively rotatable one within the other, one of said members having a circumferentially continuous clutching surface and the other of said members having a series of lands providing a series of camming surfaces disposed oppositely of said clutching surface and forming therewith a series of wedge-like spaces between said clutching surface and said camming surfaces, wedging elements engageable with said clutching surface and said camming surfaces for providing a driving connection between said inner and outer members, each of said wedging elements comprising a hollow roller, a ring member intermediate said inner and outer members and rotatable with said other member, said ring member having openings in which said rollers are disposed between said camming surfaces and said clutching surface, means carried by said ring member and operative to urge said rollers into driving connection with said clutching surface and said camming surfaces upon rotation of said inner and outer members in one direction and to yield to permit the free running of said inner and outer members upon relative motion in the opposite direction, said means comprising a lever engaging the interior of each roller adjacent its center and extending laterally therefrom, and independent resilient means acting between said intermediate ring and the laterally extending portion of each lever to yieldingly press each roller into contact with a camming surface and said clutching surface.

2. In an overrunning clutch, inner and outer clutch members rotatable on a common axis, one of said members having a cylindrical rollway, the other of said members having a series of dissimilar camming surfaces forming with said cylindrical rollway a series of wedge-like spaces extending circumferentially between said members, a wedging element disposed in each of said spaces, and means resiliently urging said wedging elements toward the narrow ends of said wedge-like spaces, whereby rotation of one of said members in one direction will cause clutching of said members so that they rotate together as a unit, while rotation in the other direction will result in overrunning, said cylindrical rollway having an eccentric mounting with respect to said common axis, said eccentric mounting and said dissimilar camming surfaces cooperating to insure that said wedging elements never make clutching engagement with said cylindrical rollway and said camming surfaces at the same point on either throughout one complete revolution of said inner and outer members with respect to each other.

3. In an overrunning clutch, inner and outer clutch members rotatable on a common axis, one of said members having a cylindrical rollway, the other of said members having a series of camming surfaces forming with said cylindrical rollway a series of wedge-like spaces extending circumferentially between said members, said camming surfaces each having a different length from the others to thereby result in uneven spacing of said surfaces circumferentially of the clutch, a wedging element disposed in each of said spaces, and means resiliently urging said wedging elements toward the narrow ends of said wedge-like spaces, whereby rotation of one of said members in one direction will cause clutching of said members so that they rotate together as a unit, while rotation in the other direction will result in overrunning, said cylindrical rollway having an eccentric mounting with respect to said common axis, said eccentric mounting and said uneven spacing of the camming surfaces cooperating to insure that said wedging elements never make clutching engagement with said cylindrical rollway and said camming surfaces at the same point on either throughout one complete revolution of said inner and outer members with respect to each other.

4. In an overrunning clutch, inner and outer clutch members rotatable on a common axis, one of said members having a cylindrical rollway, the other of said members having a series of camming surfaces forming with said cylindrical rollway a series of wedge-like spaces extending circumferentially between said members, said camming surfaces each being differently spaced from the said common axis, a wedging element disposed in each of said spaces, and means resiliently urging said wedging elements toward the narrow ends of said wedge-like spaces, whereby rotation of one said members in one direction will cause clutching of said members so that they rotate together as a unit, while rotation in the other direction will result in overrunning, said cylindrical rollway having an eccentric mounting with respect to said common axis, said eccentric mounting and said difference in radial spacing of the camming surfaces cooperating to insure that said wedging elements never make clutching engagement with said cylindrical rollway and said camming surfaces at the same point on either throughout one complete revolution of said inner and outer members with respect to each other.

References Cited in the file of this patent

UNITED STATES PATENTS

| | | |
|---|---|---|
| 1,977,588 | Matson | Oct. 16, 1934 |
| 2,060,249 | Scott | Nov. 10, 1936 |
| 2,175,876 | Chilton | Oct. 10, 1939 |
| 2,705,552 | Cross et al. | Apr. 5, 1955 |